United States Patent [19]

Dudhela

[11] Patent Number: 5,201,054
[45] Date of Patent: Apr. 6, 1993

[54] APPARATUS AND METHOD FOR CONTROLLING THE TRANSFER OF DIGITAL INFORMATION BETWEEN SERVICE PROCESSORS MEMORIES IN A COMPUTER

[75] Inventor: Narendra B. Dudhela, Santa Clara, Calif.

[73] Assignee: Amdahl Corporation, Sunnyvale, Calif.

[21] Appl. No.: 870,781

[22] Filed: Apr. 16, 1992

Related U.S. Application Data

[63] Continuation of Ser. No. 420,678, Oct. 10, 1989, abandoned, which is a continuation of Ser. No. 137,174, Dec. 23, 1987, abandoned.

[51] Int. Cl.[5] ............................................. G06F 9/00
[52] U.S. Cl. ...................................... 395/800; 395/425;
395/275; 364/DIG. 1; 364/243; 364/229;
364/260
[58] Field of Search ............... 395/800, 325, 275, 200, 395/425

[56] References Cited

U.S. PATENT DOCUMENTS

| | | | |
|---|---|---|---|
| 4,162,520 | 7/1979 | Cook et al. | 364/200 |
| 4,246,637 | 1/1981 | Brown et al. | 364/200 |
| 4,298,928 | 11/1981 | Etoh et al. | 364/200 |
| 4,471,427 | 9/1984 | Harris | 364/200 |
| 4,481,578 | 11/1984 | Hughes et al. | 364/200 |
| 4,695,952 | 9/1987 | Howland | 364/200 |
| 4,700,292 | 10/1987 | Campanini | 364/200 |

Primary Examiner—Thomas C. Lee
Assistant Examiner—Mehmet Geckil
Attorney, Agent, or Firm—Fliesler, Dubb, Meyer & Lovejoy

[57] ABSTRACT

An apparatus is provided for controlling the transfer of data between first and second service processors; wherein the respective first and second service processors are adapted to provide respective transfer instructions requesting such data transfers, the apparatus comprising: first lines for conducting digital signals; second lines for conducting digital signals; first integrated circuit for providing digital signals to said first lines in response to first control signals and for receiving digital signals from said second lines in response to second control signals; second integrated circuit for receiving digital signals from said first lines in response to second control signals and for providing digital signals to said second lines in response to first control signals; a first microcode protocol unit for receiving the instructions and for alternatively providing first control signals or second control signals to said first integrated circuit; and a second microcode protocol unit for receiving the instructions and for alternatively providing first control signals or second control signals to said second integrated circuit.

5 Claims, 7 Drawing Sheets

APPARATUS AND METHOD FOR CONTROLLING THE TRANSFER OF DIGITAL INFORMATION BETWEEN SERVICE PROCESSORS MEMORIES IN A COMPUTER

This application is a continuation of Ser. No. 07/420,678, filed Oct. 10, 1989, now abandoned which is a continuation of Ser. No. 07/137,174, filed Dec. 23, 1987, now abandoned.

BACKGROUND OF THE INVENTION

1. Field of the Invention

The invention relates generally to the transfer of data within a computer and more particularly to the control of the transfer of data between multiple processors of a computer.

2. Description of the Related Art

In large computers having multiple central processing units, each CPU typically has an associated service processor. The service processor, for example, initializes the CPU by loading microcode, setting internal latches and activating clocks when the computer is started. Also, service processors often can be used to facilitate diagnostics by keeping a running record of the status of their associated CPUs.

In operation, for example, the multiple service processors of a multiple CPU computer alternatively can operate independently or can operate jointly as a unit. Generally, in order to operate jointly, each service processor needs to have access to computer system information which is available to the others.

For example, when the respective service processors operate independently, they can keep independent running records of the status of their associated CPUs. In order to operate as a unit, however, these independent records often must be made available to each service processor.

Such sharing of information typically involves the transfer of data between the respective service processors. The transfer of such data ordinarily is a relatively routine task. It is desirable that the operating systems of the service processors not be unduly burdened with controlling the transfer of such data.

Thus, there has been a need for an apparatus and method to control the transfer of data between multiple service processors of a computer without unduly burdening the operating system of the service processor. The present invention meets this need.

SUMMARY OF THE INVENTION

The invention provides a novel apparatus for controlling the transfer of data between service processors of a multiple service processor computer. The apparatus includes first and second lines for conducting digital signals. A first integrated circuit provides digital signals to the first lines in response to first control signals and receives digital signals from the second lines in response to second control signals. A second integrated circuit receives digital signals from the first lines in response to second control signals and provides digital signals to the second lines in response to first control signals. A first microcode protocol unit receives the instructions and alternatively provides the first control signals or the second control signals to the first integrated circuit. A second microcode protocol unit receives the instructions and alternatively provides the first control signals or the second control signals to the second integrated circuit.

The invention also comprises a method for controlling the transfer of data between service processors, wherein the service processors provide respective transfer instructions requesting the data transfers. The method includes the steps of providing data stored by one service processor to first lines in response to first control signals, and providing data stored by another service processor to second lines in response to second control signals. The method also includes the step of receiving the respective transfer instructions and alternatively providing the first signals or the second signals, such that at each moment in the course of a data transfer, data is provided either exclusively to the first lines or exclusively to the second lines.

The apparatus and method of the present invention advantageously permit the control of data transfers between service processors in a computer without unduly burdening the service processor's operating systems. The first and second circuits control the actual provision of data to the first and second lines, and the first and second microcode protocol units control the first and second integrated circuits. Thus, the apparatus and method advantageously can control data transfers without significant involvement of the service processors, operating systems.

These and other features as well as the advantages of the present invention will become more apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DETAILED DESCRIPTION OF THE PREFERRED EMBODIMENT

The present invention comprises a novel apparatus and associated method to control transfers of data within a computer. The following description is presented to enable any person skilled in the art to make and use the invention, and is provided in the context of a particular application and its requirements. Various modifications to the preferred embodiment and method will be readily apparent to those skilled in the art, and the generic principles defined herein may be applied to other embodiments and applications without departing from the spirit and scope of the invention. Thus, the present invention is not intended to be limited to the embodiment and method shown and described, but is to be accorded the widest scope consistent with the principles and features disclosed herein.

Figure 1:
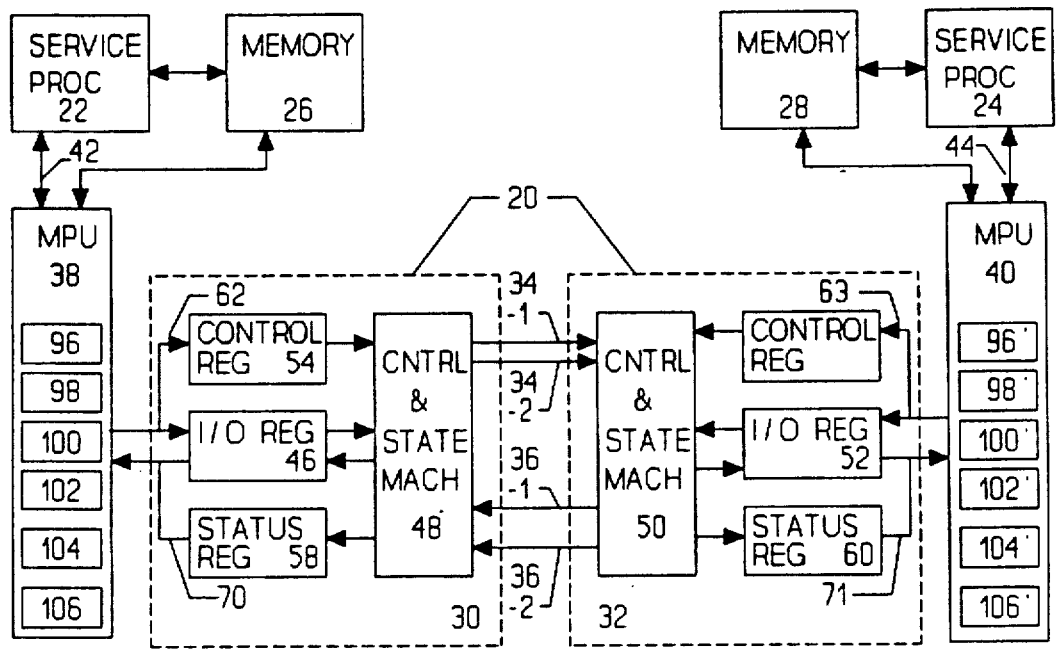
FIG. 1 is a block diagram of a presently preferred embodiment of a control system in accordance with the invention.

Referring to the illustrative block diagram of FIG. 1, there is shown a control system 20 in accordance with a presently preferred embodiment of the invention. The control system 20 controls the transfer of data used by first and second service processors 22 and 24. The data is stored by first memory unit 26 associated with the first service processor 22 and by second memory unit 28 associated with the second service processor 24.

The control system 20 includes respective first and second integrated circuit transmitter/receivers (ICTRs) 30 and 32 (shown within dashed lines) which are coupled to transfer data between one-another on respective first lines 34-1 and 34-2 and second lines 36-1 and 36-2. The control system 20 also includes respective first and second microcode protocol units (MPUs) 38 and 40 which respectively control the operation of the first and second ICTRs 30 and 32 and monitor each other's operation.

In operation, the respective first and second service processors 22 and 24 can provide on respective lines 42 and 44 transfer instructions causing the control system 20 to control the transfer of data between the respective first and second memory units 26 and 28. Respective bytes of data are transferred serially, one bit at a time, between the respective first and second ICTRs 30 and 32. The transfer of data between the first ICTR 30 and the first memory unit 26 is controlled by the first MPU 38. Similarly, the transfer of data between the second ICTR 32 and the second memory unit 28 is controlled by the second MPU 40. The respective first and second MPUs 38 and 40 coordinate their control operations by exchanging status and control information via the respective first and second ICTRs 30 and 32.

The first service processor 22 can provide transfer instructions on line 42. In response to such transfer instructions, the first MPU 38 controls the operation of first ICTR 30 in transferring data between the first and second memory units 26 and 28. The first MPU 38 also provides MPU-control bytes to the second MPU 40 and responds to MPU-control bytes provided by the second MPU 40.

Likewise, the second service processor 24 can provide transfer instructions on line 44. In response to such transfer instructions, the second MPU 40 controls the operation of the second ICTR 32 in the transfer of data. The second MPU 40 also provides MPU-control bytes to the first MPU 38 and responds to MPU-control bytes provided by the first MPU 38.

In the course of the transfer of data from the first memory unit 26 to the second memory unit 28, for example, the first MPU 38 provides to first I/O register 46 successive bytes of a block of data stored by the first memory unit 26. In the preferred embodiment, the blocks can be up to 512 bytes long, and each byte comprises eight-bits. A first control and state machine (CSM) 48 provides the successive bytes serially, one bit at a time, via line 34-1, to a second CSM 50. The second CSM 50 provides the successive bytes, via second I/O register 52, to the second MPU 40 for transfer to the second memory unit 28.

In the course of such a transfer, the first MPU 38, provides ICTR-control bytes to a first control register 54 to control the operation of the first CSM 48, and the second MPU 40 provides ICTR-control bytes to a second control register 56 to control the operation of the second CSM 50. Furthermore, the first CSM 48 provides first status bytes, via a first status register 58, to the first MPU 38 to inform it of the progress of respective byte transfers. Similarly, the second CSM 50 provides second status bytes, via a second status register 60, to the second MPU 40 to report the progress of the respective byte transfers. Finally, the first MPU 38 provides MPU-control bytes to the first I/O register for transmission to the second MPU 40 to report the status of the first MPU 38. Conversely, the second MPU 40 provides MPU-control bytes to the second I/O register 52 for transmission to the first MPU 38 to report the status of the second MPU 40.

Figure 2:
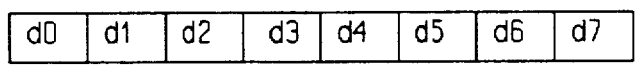
FIG. 2 illustrates the organization of a data byte transferred by the system of FIG. 1.
Figure 3:
FIG. 3 illustrates the organization of an ICTR-control byte used to control the integrated circuit transmitter/receivers (ICTR) of the system of FIG. 1.
Figure 4:
FIG. 4 illustrates the organization of a status byte used to report the status of the ICTRs of the system of FIG. 1.
Figure 5:
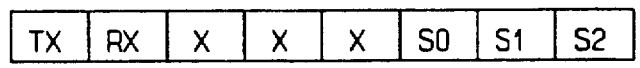
FIG. 5 illustrates the organization of an MPU-control byte used to report the status of the microcode protocol units (MPU) of the system of FIG. 1.

FIGS. 2, 3, 4 and 5 respectively illustrate the organization of pertinent bits in respective eight-bit: data bytes, ICTR-control bytes, status bytes and MPU-control bytes. Each data byte comprises eight bits, d0-d7 as shown in FIG. 2. Each ICTR-control byte includes mode bits m0, m1 and Error Reset (ER) and Control Reset (CR) bits as shown in FIG. 3. The mode bits control the transitioning of the first and second CSMs 48 and 50 through each of a plurality of states described below. The ER bit resets mode error and parity error bits discussed below. The CR resets the entire CSM circuit and, with the mode bits, causes it to transition to an IDLE state. Each status byte, as shown in FIG. 4, includes a bit B0 which indicates when the I/O registers 46 and 52 are available to receive or transmit another data byte or MPU-control byte. Status bit B6 reports mode errors, and status bit B7 reports parity errors. Mode Errors can occur when both ICTRs 30 and 32 attempt to simultaneously transmit. Finally, each MPU-control byte includes, as shown in FIG. 5, a transmit TX bit and a receive RX bit which, as explained below, indicates whether the MPUs 38 and 40 are operating as protocol transmitters PXMTR or protocol receivers PRCVR. Bits S0, S1 and S2, as explained below, report the state in which the MPUs 38 and 40 are operating.

The respective first and second ICTRs 30 and 32 exchange MPU-control bytes, as explained more fully below, even during time intervals when neither the first service processor 22 nor the second service processor 24 provides transfer instructions on respective lines 42 or 44. This exchange during periods when no transfer instructions are received is controlled by the respective first and second MPUs 38 and 40. The exchange substantially ensures that there will not be contentions between the respective first and second service processors 22 and 24 if they happen to request transfers of data at substantially the same time.

Figure 6:
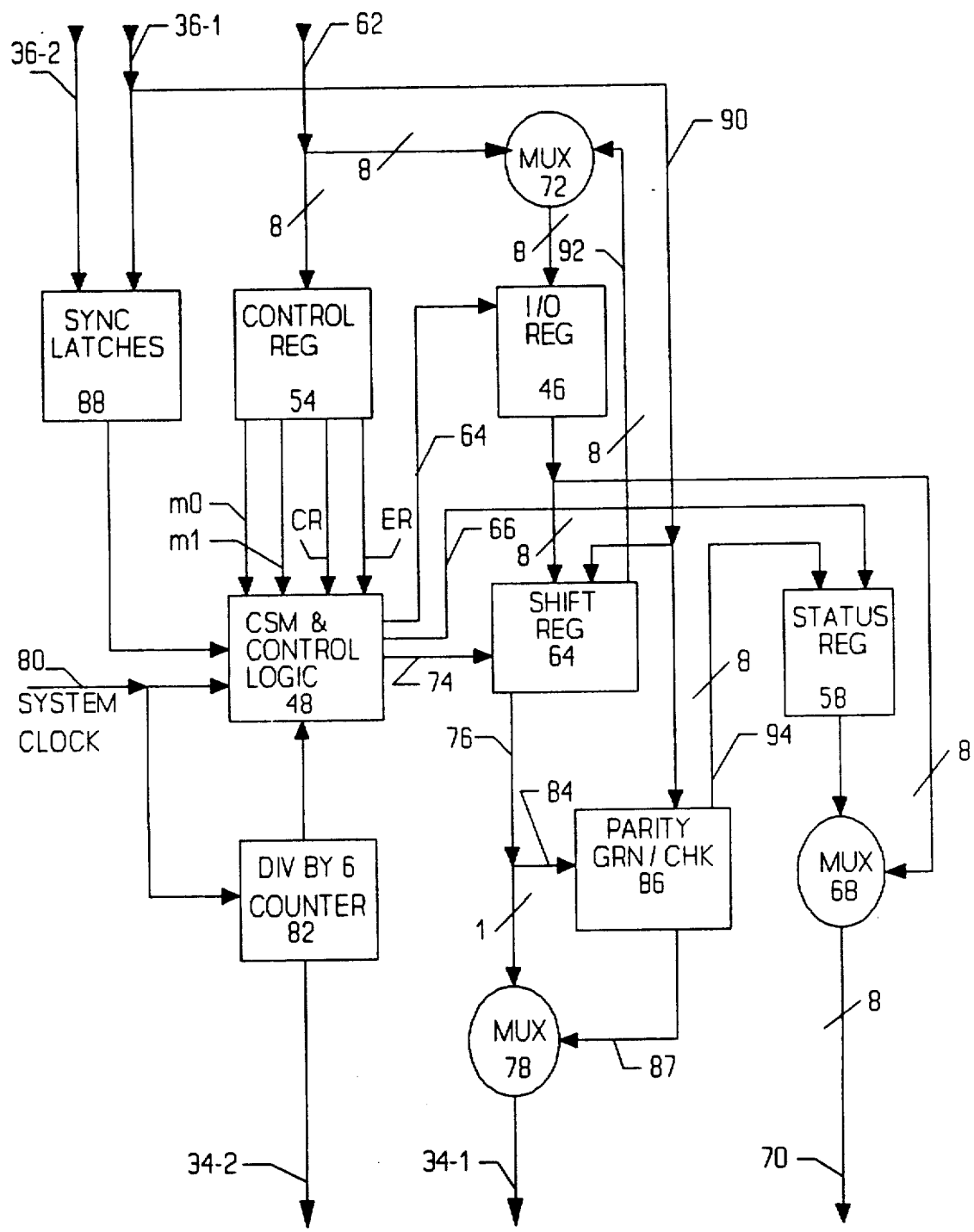
FIG. 6 is a detailed block diagram of the first ICTR of the system of FIG. 1.

Referring now to the drawings of FIG. 6, there is shown a block diagram illustrating details of the first ICTR 30. The respective first and second ICTRs 30 and 32 are identical, and therefore, the description and drawings of FIG. 6 suffice to explain corresponding details of the second ICTR 32 as well.

The first ICTR 30 receives ICTR-control bytes, data bytes and MPU-control bytes from the first MPU 38 on lines 62. The ICTR-control bytes are provided to the first control register 54, and the data bytes and MPU-control bytes are provided to the first I/O register 46.

The first MPU 38 controls the operation of multiplexer 72 to cause it to select the bytes on lines 62 when data bytes or MPU-control bytes are to be provided to the first I/O register 46. The manner in which the first MPU 38 controls multiplexer 72 will be understood by those skilled in the art and need not be described in detail.

The ICTR-control signals control the operation of the first CSM 48, and the first CSM 48 provides signals on line 64 which trigger the first I/O register to input the data from the multiplexer 72.

In the preferred embodiment of the control system 20, data is transmitted between the ICTRs 30 and 32 in blocks of up to 512 bytes each. In the course of a transmission of such a block from the first ICTR 30 to the second ICTR 32, successive eight-bit data bytes are loaded into the first I/O register 46. The first I/O register 46, in turn, loads each successive data byte into shift register 64. When the first I/O register 46 has transferred an entire byte into the shift register 64, the first status register 58 is loaded, via line 66, with a status bit B0 in a logical state indicating that the first I/O register 46 is available to receive the next successive byte in the block for transmission.

When the shift register 64 has been loaded with a data byte provided via the first I/O register 46, the first CSM 48 provides on line 74 signals which cause the shift register 64 to provide the byte, one bit at a time, on line 76. The first CSM 48 controls the operation of multiplexer 78, in a manner which will be understood to those skilled in the art, to cause it to select the serially provided bits on line 76. The timing of the first CSM 48 is controlled by system clock signals provided on line 80, and by a divide-by-N counter 82.

The respective serial data bits are provided, via first one-bit line 34-1, to the second ICTR 32. Meanwhile, the divide-by-N counter 82 provides to the second ICTR 32, via first one-bit line 34-2, first data enable signals to indicate when successive valid data bits are available on line 34-1. It will be appreciated that the value of divisor N depends upon the particular application of the control system 20. Thus, for each bit provided on first line 34-1, a respective data enable bit is provided on first line 34-2.

Furthermore, each of the eight-bits of every byte shifted through shift register 64 is provided, via line 84, to parity generator and checker (PGC) 86. The PGC 86 generates a parity bit for each respective byte. When the eighth bit of a respective byte has been provided on first line 34-1, the first CSM 48 causes multiplexer 78 to select the parity signal on line 87 and to provide it on first line 34-1. Meanwhile, the divide-by-N counter 82 provides on first line 34-2 another data enable signal to indicate the presence of a valid parity bit on first line 34-1. Thus, each byte transmitted by the first ICTR 30 to the second ICTR 32 is accompanied by a parity bit.

During the transmission of a block of data, the first MPU 38 monitors the contents of the first status register 58 by controlling the operation of multiplexer 68 to cause the selection on lines 70 of status signals provided by the first status register 58. The manner in which the first MPU 38 controls the operation of multiplexer 68 will be understood by those skilled in the art and need not be described in detail. Upon receipt by the first MPU 38 of a status bit B0 in a logical state indicating that the first I/O register 46 is available to receive another byte of data for transmission, the first MPU 38 provides on lines 62 a next successive byte of data. The first MPU 38 causes multiplexer 72 to provide that data to the first I/O register 46. In this manner, a block of data of up to 512 bytes can be transmitted on first line 34-1.

Figure 7:
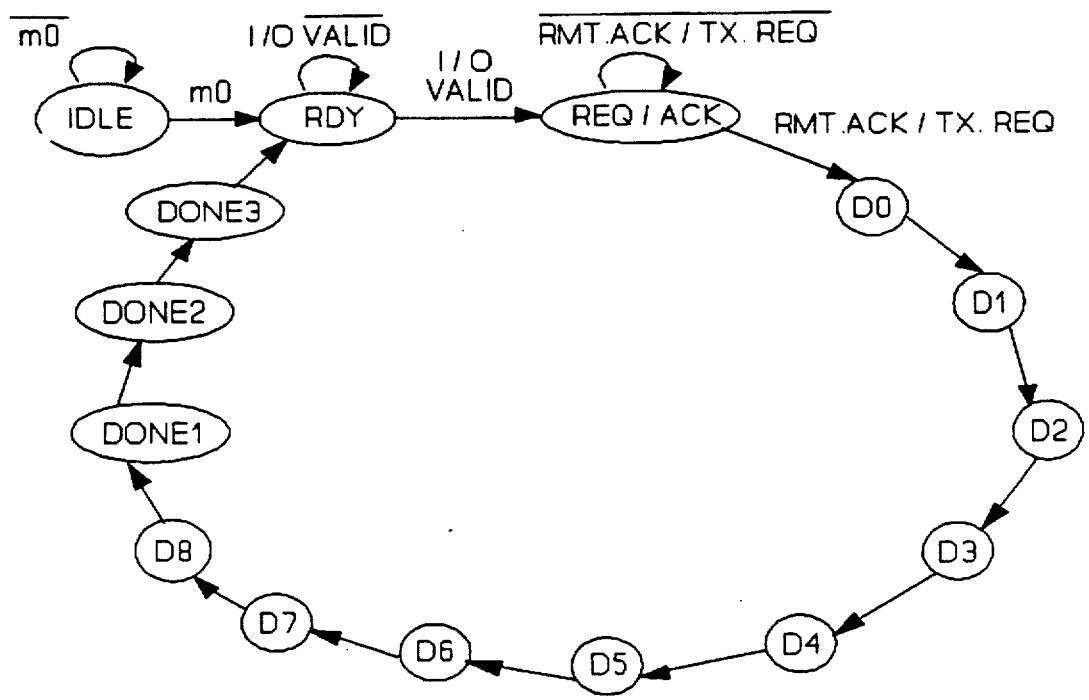
FIG. 7 is a state transition diagram illustrating the state transitions of a control and state machine (CSM) of the ICTR of FIG. 6 during byte transmissions.

The operation of the first ICTR 30 in transmitting data to the second ICTR 32 will be better understood from an explanation of the states through which the first CSM 48 transitions. Referring to the illustrative state transition diagram of FIG. 7, the first MPU 38 initiates a transmit operation providing an ICTR-control byte to the first control register 54. The ICTR-control byte includes m0, m1 mode bits in respective logical 0, 0 states, and the CR and ER bits are in logical 1, 1 states to reset CSM 48 and to transition it to an IDLE state and to reset the error bits in status register 58. Then, the first MPU 38 provides another ICTR-control byte in which the mode bits m0, m1 are in logical 1, 0 states. In response, the first CSM 48 transitions from the IDLE to the READY state.

The first CSM 48 undergoes a state transition from the READY state to the REQUEST/ACKNOWLEDGE state when the first MPU 48 loads into the first I/O register 46 a data byte to be transmitted. It should be noted that upon the loading of the byte into the first I/O register 46, status bit B0 in the first status register 58 is set, via lines 66, to a logical state indicating that valid data resides in the first I/O register 46 and that the first I/O register 46 is not available.

In the REQUEST/ACKNOWLEDGE state, the first ICTR 30 asserts logical signals 1,1 on first lines 34-1 and 34-2 to request permission to transmit the data byte. The second ICTR 32, which is to receive the data byte, acknowledges the request by asserting logical 0,1 on second lines 36-1 and 36-2 if and when it is ready to receive the data byte.

The first CSM 48 then transitions through states D0 through DP, serially transmitting on first line 34-1 data bits d0 through d7 followed by a parity bit. Corresponding data enable bits are concurrently provided on first lines 34-2. When the eight data bits and the parity bit have been transmitted, the first CSM 48 transitions through states DONE1, DONE2 and DONE3 and returns to the READY state where it awaits the provision of another successive data byte to the first I/O register 46.

Alternatively, the first ICTR 30 also can receive data from the second ICTR 32. It will be appreciated that the two ICTRs 30 and 32 operate as a half-duplex system in which either only the first ICTR 30 or only the second ICTR 32 transmits at any given time. Conversely, only the first ICTR 30 or only the second ICTR 32 receives at any given time. Of course, when one ICTR transmits the other receives.

In the course of the receipt of data by the first ICTR 30 from the second ICTR 32, successive data bytes are received serially, one bit at a time, on second one-bit line 36-1. Each respective bit on the second line 36-1 is accompanied by a corresponding data enable bit on second line 36-2.

The respective data-enable bits on second line 36-2 are received by synchronizing latches 88. The respective data enable bits on second line 36-2 indicate when a respective valid data bit is provided on second line 36-1. The synchronizing latches 88 latch the respective data-enable bits on line 36-2. The synchronizing latches 88 permit the transfer of data from the second ICTR 32 to the first ICTR 30 even when the respective first and second ICTRs 30 and 32 operate asynchronously.

The data is received via line 90 into shift register 64. When a complete eight-bit byte of data has been loaded into the shift register 64, that byte is transferred, via lines 92, to the first I/O register 46. The first CSM 48 causes multiplexer 72 to select the data stored in the shift register 64 for transfer to the first I/O register 46.

Each bit received on second line 36-1 also is provided to the PGC 86. For each eight-bit byte, the PGC 86 generates a parity bit and compares it with a parity bit received for that byte on second line 36-1. If there is a mismatch, the PGC 86 provides on line 94 an error signal which causes status bit B7 to transition to a logical state indicating the occurrence of a parity error.

The first MPU 38 causes multiplexer 68 to select a status byte provided by the first status register 58 to permit the monitoring of status bit B7. In the event of a parity error, the first MPU 38 halts the transfer of data from the second ICTR 32 to the first ICTR 30 as explained below.

If for a respective byte, there is no parity error, the first MPU 38 causes multiplexer 68 to select the received byte from the I/O register 46 on lines 96. The byte is provided to the first MPU 38, via line 70, for transfer to the first memory unit 26.

Figure 8:
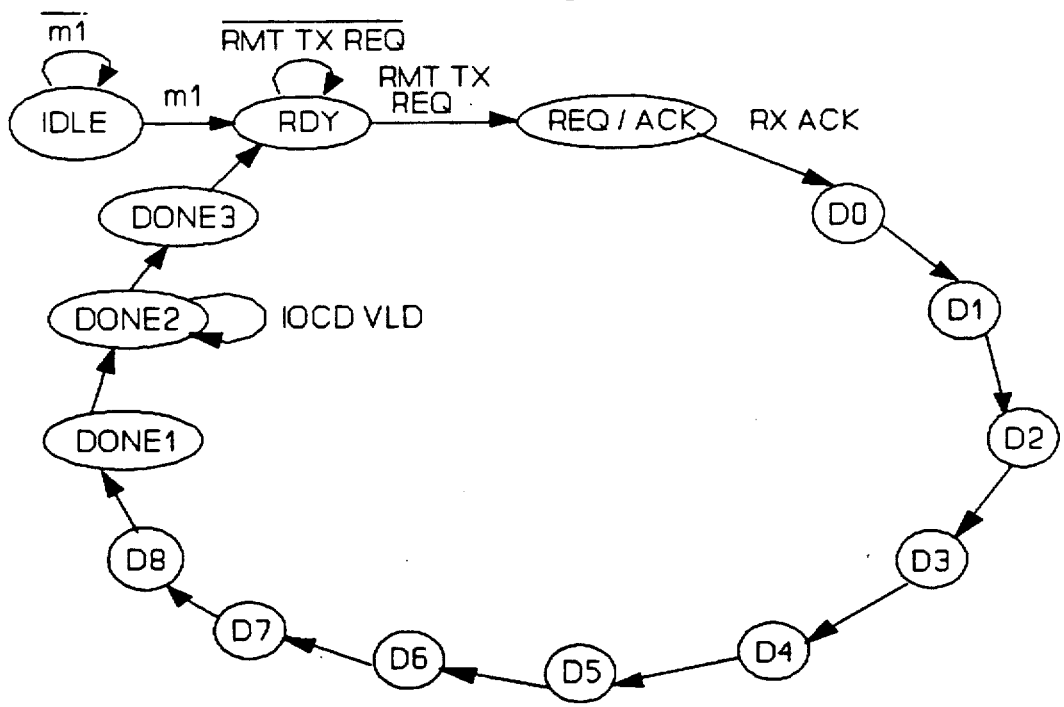
FIG. 8 is a state transition diagram illustrating the state transitions of a CSM of the ICTR of FIG. 6 during byte receptions.

The operation of the first ICTR 30 in receiving data from the second ICTR 32 will be better understood from an explanation of the states through which the first CSM 48 transitions. Referring to the illustrative state transition diagram of FIG. 8, the first MPU 38 initiates a receive operation by providing an ICTR-control byte in which mode bits m0, m1 are in logical 0,0 states, and the CR and ER bits are in logical 1, 1 states to reset CSM 48 and to transition it to an IDLE state and to reset the error bits in status register 58. Then, the first MPU 38 provides an ICTR-control byte in which mode bits m0, m1 are in logical 0,1 states. In response, the first CSM 48 transitions from the IDLE state to a READY state.

The first CSM 48 undergoes a state transition from the READY state to the REQUEST/ACKNOWLEDGE state when it detects logical state 1,1 signals on respective second lines 36-1 and 36-2. It responds by asserting logical 0,1 signals on respective lines 34-1 and 34-2 indicating that the first CSM 48 is ready to receive data.

Upon the assertion of the logical 0,1 signals on lines 34-1 and 34-2, the first CSM 48 transitions to state D0. The synchronizing latches 88 detect the received data enable bit on second line 36-2 and use it to synchronize the receipt of bit d0 on second line 36-1. Bit d0 is shifted into shift register 64, and the first CSM 48 then transitions to the D1 state.

Each of the bits, d0-d7, of the received byte is received in a similar fashion as the first CSM 48 transitions through states D0 to D7. In state DP, a parity bit for the byte is received, and parity is checked by the PGC 86.

The first CSM 48 transitions from the DP state to DONE1 and then to DONE2. In the DONE2 state, if the first I/O register 46 is available, then the first CSM 48 transfers the entire received byte into the I/O register 46 via lines 92 and multiplexer 72. The inputted byte then can be transferred, via multiplexer 68 and lines 70, to the first MPU 38 for provision to the first memory unit 26. After a received byte is inputted to the first I/O register 46, the first CSM 48 transitions to state DONE3 and then back to the READY state where it awaits the assertion by the second ICTR 32 of logical 1,1 signals on second lines 36-1, 36-2 and the next data byte to be received.

On the other hand, if in the DONE2 state the first I/O register 46 is not available, then the first CSM 48 remains in the DONE2 state until the first I/O register 46 becomes available.

Thus, it will be appreciated that the respective first and second ICTRs 30 and 32 interact directly with each other to control the transfer between them of respective data bytes. Once a byte is loaded into the first I/O register 46 for transfer to the second ICTR 32, for example, the transfer occurs substantially without intervention by the first or second MPUs 38 or 40. The interaction between the respective first and second ICTRs 30 and 32 ensures that the automatic transfer of a respective byte does not commence before both of the ICTRs 30 and 32 are prepared for it.

For example, referring to FIG. 4, and particularly to state DONE2, it will be appreciated, that the first ICTR 30 cannot receive a next successive byte until the previous byte has been read out of the first I/O register 46. Since the respective first and second ICTRs 30 and 32 are transferring data to and from different memory units 26 and 28 there may be times when the second ICTR 32 is prepared to transfer a next byte, but the first ICTR 30 is not yet ready to receive it. Delaying the transition of the first CSM 48 from the DONE2 state through to the READY state until the first I/O register 46 is available, ensures that the second ICTR 32 will not provide a next byte until the first ICTR 30 is prepared to receive it.

Although the discussion above refers to the transmission of data bytes, MPU-control bytes are transferred between the ICTRs 30 and 32 in substantially the same manner. However, MPU-control bytes, as will be explained below, ordinarily are transferred one byte at a time rather than in large blocks as are data bytes.

The following description explains the operation of the respective first and second MPUs 38 and 40 in controlling transfers of data. The two MPUs use the MPU-control bytes to interact with one-another through the respective first and second ICTRs 30 and 32. The interaction enables the MPUs to control transfers without significant intervention by the operating systems of respective first and second service processors 22 and 24.

Figure 9A:
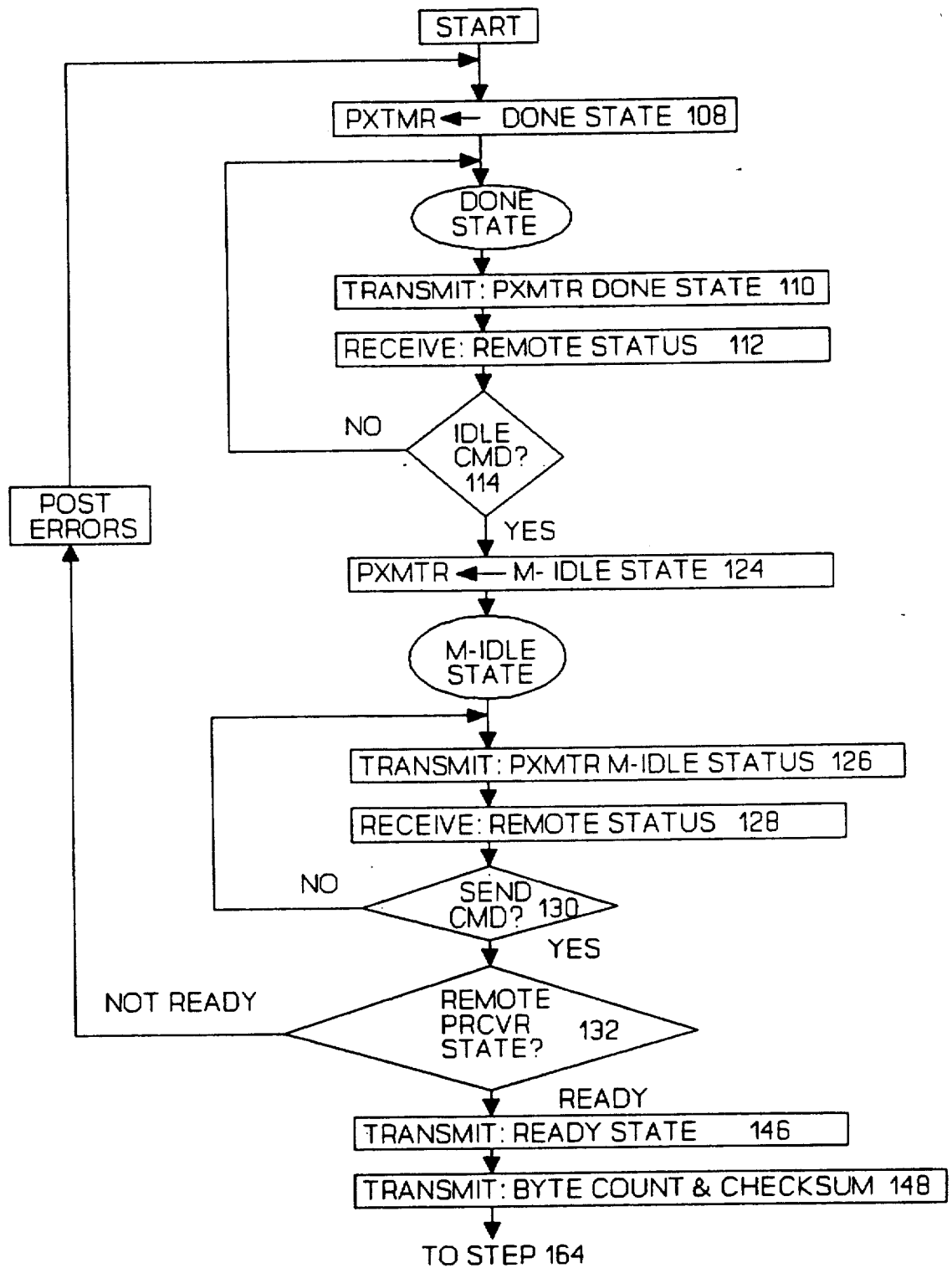
FIGS. 9A and B is a flow diagram illustrating the operation of the MPUs of the control system of FIG. 1 as a protocol transmitter.
Figure 9B:
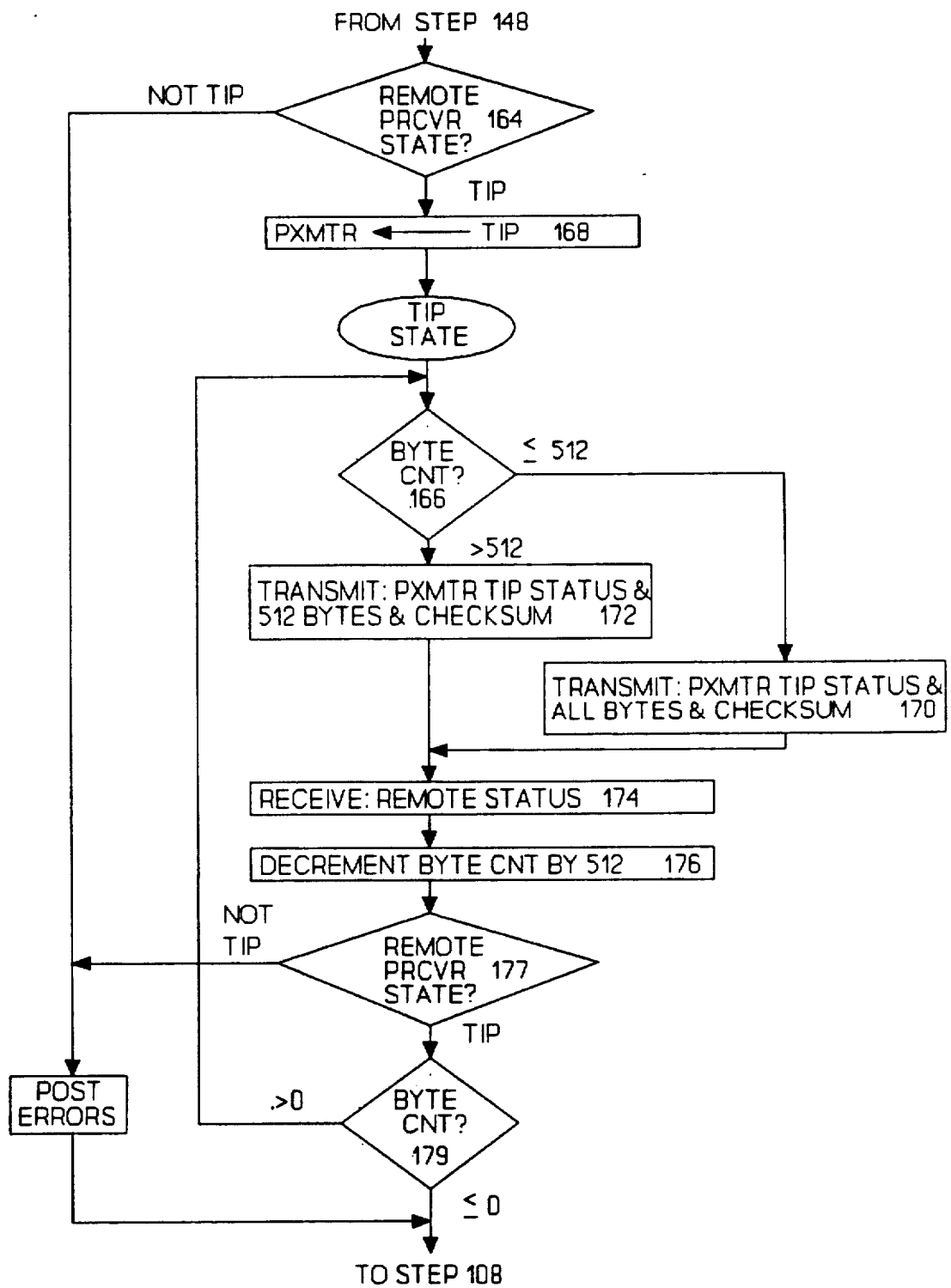
Figure 10A:
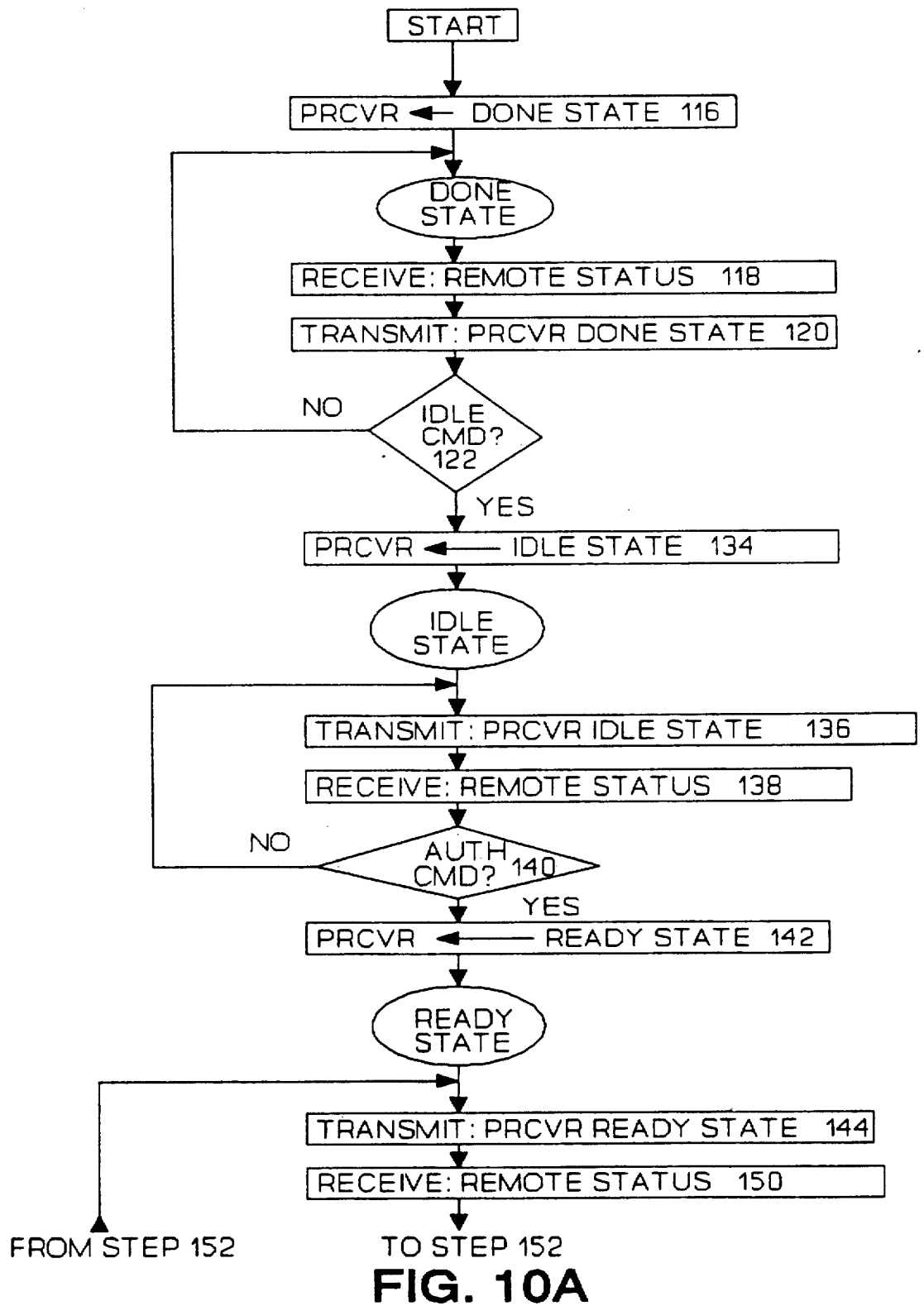
FIGS. 10A and B is a flow diagram illustrating the operation of the MPUs of the control system of FIG. 1 as a protocol receiver.
Figure 10B:
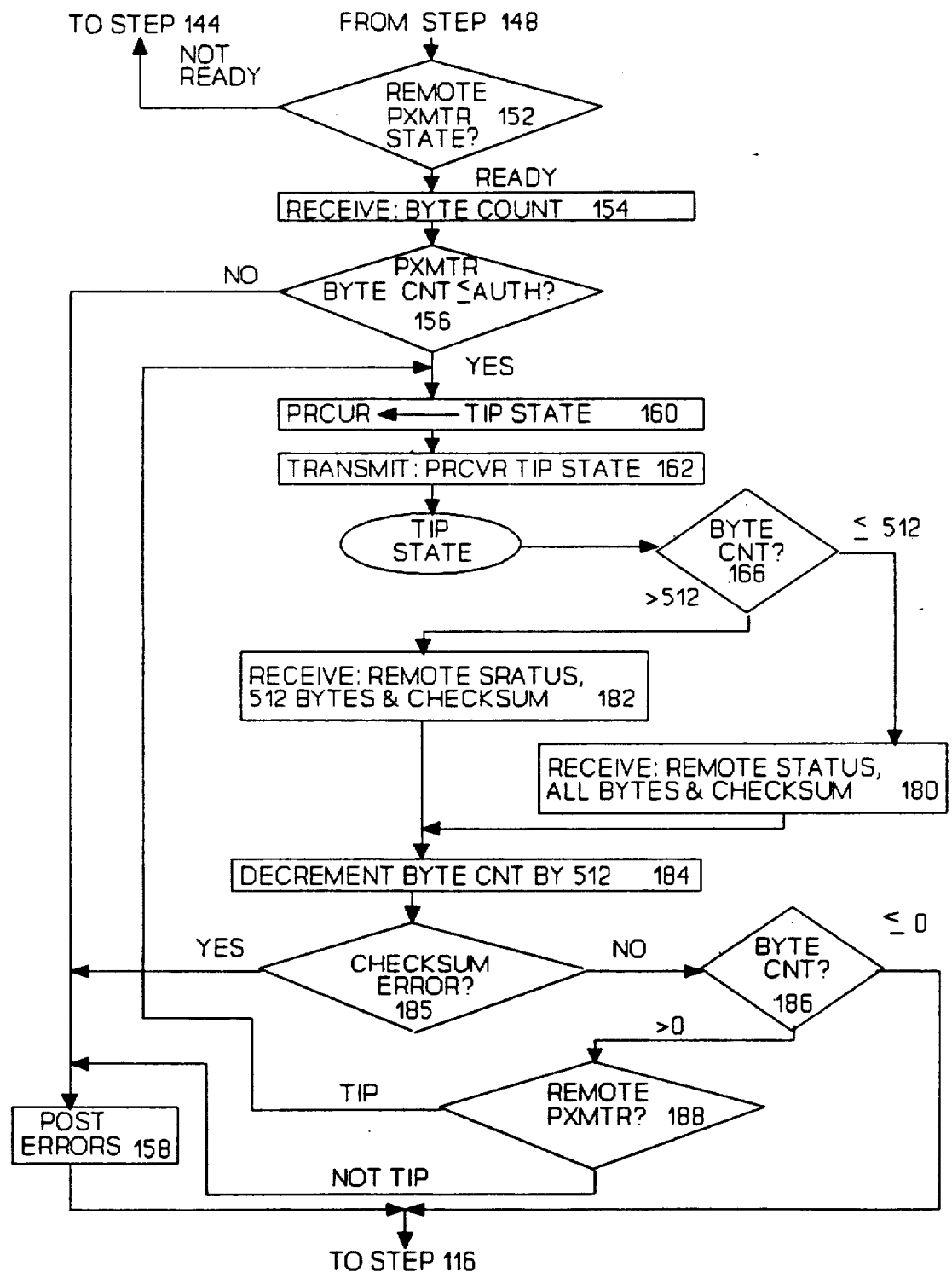

The operation of the respective first and second MPUs 38 and 40 is explained with reference to the illustrative flow diagrams of FIGS. 9 and 10. The respective first and second MPUs 38 and 40 are implemented in microcode. Each can operate either as a protocol transmitter or as a protocol receiver. FIG. 9 illustrates their operation as a protocol transmitter, and FIG. 10 illustrates their operation as a protocol receiver. In the following exemplary description, the first MPU 38 operates as a protocol transmitter, and the second MPU 40 as a protocol receiver. However, alternatively, the first MPU 38 can operate as a protocol receiver, and the second MPU 40 can operate as a protocol transmitter.

The respective first and second MPUs 38 and 40 each include a plurality of registers for receiving data used to control transfers between the first and second ICTRs 30 and 32. The following description explains the registers in the first MPU 38 shown in FIG. 1, and reference is made to the first service processor 22. However, it should be understood that corresponding registers in the second MPU 40 indicated by identical primed reference numerals are identical to their counterparts in the first MPU 38.

A transmitter instruction/status register (TISR) 96 is 32-bits wide. Bits 0 through 15 constitute the instruction register. Bits 16 through 31 constitute a transmitter status register. During transmissions, the MPU status is monitored through the TISR 96 as are error conditions discussed below. The first MPU 38 can support three transmit instructions provided by the operating system of the first service processors 22: SEND, CANCEL and M-IDLE.

A transmitter memory address register (TMAR) 98 contains the address pointer of data to be transmitted. A transmitter byte count register (TBCR) 100 specifies the number of bytes to be transmitted.

A receiver instruction/status register (RISR) 102 is 32-bits wide. Bits 0 through 15 constitute the instruction register. Bits 16 through 31 constitute a receiver status register. During receptions, the MPU status is monitored through the RISR 102 as are error conditions discussed below. The first MPU 38 can support three receive instructions provided by the operating system of the first service processor 22: AUTHORIZE, CANCEL and M-IDLE.

A receiver memory address register (RMAR) 104 contains the address pointer for received data. A receiver byte count register (RBCR) 106 specifies the number of bytes to be received.

As discussed above, even when no transfer instructions are provided by either the first or the second service processors 22 or 24, the first and second ICTRs 30 and 32 still transmit MPU-control bytes back and forth between each other. Referring to FIG. 9, when the first MPU 38 is operating as a protocol transmitter and no transfer instructions are received on line 42 it enters a DONESTATE illustrated in step 108. The first MPU 38 provides an ICTR-control byte to the first control register 54 causing the first ICTR 30 to transmit an MPU-control byte to the second ICTR 32 in step 110. The MPU-control byte transmitted in step 110 reports to the second MPU 40 that the first MPU 38 is operating as a protocol transmitter in the DONESTATE. In step 112, the first MPU 38 provides an ICTR-control byte to the first ICTR 30 causing it to receive a byte from the second ICTR 32 reporting that the second MPU 40 is operating as a protocol receiver and indicating its state. Unless the first MPU 38 detects an M-IDLE instruction in the TISR 96 at decision step 114, it loops back and repeats steps 110 and 112.

Referring now to FIG. 10, during the time when the first MPU 38 is in the loop comprising steps 110, 112, and 114, the second MPU 40 operates as a protocol receiver and loops through steps 118, 120 and 122. In the absence of transfer instructions on line 44, the second MPU 40, operating as a protocol receiver, enters the DONESTATE at step 116. In step 118, the second MPU 40 provides an ICTR-control byte to the second ICTR 32 causing it to receive the MPU-control byte transmitted by the first MPU 38 in step 110. In step 120, the second MPU 40 provides an ICTR-control byte to the second ICTR 32 causing it to transmit the MPU-control byte received by the first MPU 38 in step 112.

Unless the second MPU 40 detects an M-IDLE instruction in RISR 102' at decision step 122, it loops back to repeat steps 118 and 120.

Thus, during time periods when neither the first nor the second service processor 22 or 24 provides transfer instructions on lines 42 or 44, the first and second MPUs 38 and 40 continually cause the transfer of MPU-control bytes between the first and second ICTRs 30 and 32. This continual transfer reduces the chance of contentions in the event that both service processors request transfers of data at substantially the same time.

Referring once again to FIG. 9, when the first service processor 22 provides to the TISR 96 an M-IDLE instruction, then at step 124 the first MPU 38 enters the M-IDLESTATE. At step 126, the first MPU 38 provides an ICTR-control byte causing the first ICTR 30 to transmit an MPU-control byte reporting that the first MPU 38 has entered the M-IDLESTATE. At step 128, the first MPU 38 provides an ICTR-control byte causing the first ICTR 30 to receive from the second ICTR 32 an MPU-control byte. Unless the first MPU 38 detects a SEND instruction in the TISR 96 at decision step 130, it loops back and repeats steps 126 and 128.

When the first service processor 22 provides a SEND instruction to the TISR 96, then the first MPU 38, at step 132, determines whether the second MPU 40 is in the READYSTATE. If it is not, then the first MPU 38 loops back to step 108 and enters the DONESTATE. In the course of looping back, the first MPU 38 posts an error to the TISR 96 at step 133.

Referring to FIG. 10, when at step 118 the second ICTR 32, under control of the second MPU 40, receives an MPU-control byte reporting that the first MPU 38 is in the M-IDLESTATE, the second MPU 40 communicates this information to the second service processor 24 which determines whether to provide on line 44 an M-IDLE instruction. Upon the provision by the second service processor 24 of a M-IDLE instruction, the second MPU 40 enters the M-IDLESTATE at step 134.

At steps 136 and 138 the respective first and second ICTRS 30 and 32 exchange MPU-control bytes again. Unless the second MPU 38 detects an AUTHORIZE instruction, in the RISR 102', at decision step 140 it loops back and repeats steps 136 and 138.

When the second MPU 40 receives an AUTHORIZE instruction, then at step 142 it transitions to the READYSTATE. At step 144 the second MPU 40 causes the second ICTR 32 to transmit an MPU-control byte informing the first MPU 38 the second MPU 40 is in the READYSTATE.

Referring once again to FIG. 9, if at decision step 132 the MPU-control bytes report that the second MPU 40 is in the READYSTATE, then at step 146 the first MPU 38 transitions to the READYSTATE. At step 148 the first MPU 38 causes the first ICTR 30 to transmit an MPU-control byte indicating that the first MPU 38 has entered the READYSTATE. The first MPU 38 then causes the first ICTR 30 to transmit a byte count in order to inform the second MPU 40 of the number of bytes to be transmitted. The byte count is stored by the first MPU 38 in the TBCR 100.

Referring again to FIG. 10, the second MPU 40, at step 150, causes the second ICTR 32 to receive an MPU-control byte reporting the status of the first MPU 38. Unless the first MPU 38 is in the READYSTATE, then at decision step 152 the second MPU 40 loops back through steps 144 and 150.

In the event that at the decision step 152 the first MPU 38 is in the READYSTATE, then at step 154, the second MPU 40 receives the byte count from the first MPU 38. At decision step 156, the second MPU 40 compares the byte count with RBCR 100' which contains the number of bytes that the second service processor 24 has authorized the second MPU 40 to receive. If the byte count exceeds the authorization then the second MPU 40 goes to step 158 wherein it posts an error in RISR 102'; and it then transitions to the DONESTATE at step 116. If, on the other hand, the byte count equals or is less than the authorization, then the second MPU 40 transitions to the TRANSMISSION IN PROGRESS (TIP) state at step 160. The second MPU 40, at step 162, causes the second ICTR 32 to transmit an MPU-control byte reporting to the first MPU 38 that it is in the TIP state.

Referring again to FIG. 9, if at decision step 164, the second MPU 40 fails to provide an MPU-control byte reporting that it is in the TIP state, then the first MPU 38 posts an error at step 166, via TISR 96, and it transitions to the DONESTATE at step 108. If the second MPU 40 at step 164 provides an MPU-control byte reporting that it is in the TIP state, then at step 168 the first MPU 38 transitions to the TIP state.

If the byte count in the TBCR 100 is less than or equal to 512, then at step 170 the first MPU 38 causes the first ICTR 30 to successively transmit all of the bytes to be transmitted plus a checksum. If the byte count exceeds 512, then the first MPU 38 at step 172 causes the first ICTR 30 to transmit only 512 bytes plus a checksum.

It will be understood that the control system 20 of the preferred embodiment can transmit a block of data of up to 512 bytes. If there are more than 512 bytes to be transferred, then they must be transferred in multiple blocks.

In the course of the transfer, the TMAR 98 keeps track of the memory address in the first memory unit 26 of data bytes to be transmitted, and the RMAR 104' keeps track of the location in the second memory unit 28 where received data bytes are to be stored.

At step 174, the first MPU 38 causes the first ICTR 30 to receive an MPU-control byte from the second MPU 40. At step 176, the byte count in the TBCR 100 is decremented by 512.

If at decision step 177 the second MPU 40 is not in the TIP state, then the first MPU 38 posts an error at step 166, via TISR 96, and it transitions to the DONESTATE at step 108. Also, if at decision step 179 the decremented byte count is greater than or equal to zero, then the first MPU 38 repeats steps 170-176 as described above.

Referring now to FIG. 10, if at decision step 178 the byte count in the RBCR 100' is less than or equal 512 then at step 180 the second MPU 40 causes the second ICTR 32 to receive the entire block of bytes to be transmitted as well as a checksum. If the byte count is greater than 512, then at step 182 only 512 bytes are received. At step 184, the second MPU 40 decrements the byte count in RCSR 102' by 512.

At step 185, the second MPU 40 computes the checksum for the received bytes. It compares the computed checksum with the received checksum. If there is a discrepancy, the second MPU 40 posts an error through the RISR 96' and transitions to the DONESTATE at step 116. Otherwise, it continues to decision step 186.

At decision step 186, if the decremented byte count is less than or equals zero then the second MPU 40 transitions to the DONESTATE at step 116. If at decision step 186 the decremented byte count is greater than zero and at decision step 188 the MPU-control byte from the first MPU 38 indicates that it is still in the TIP state, then steps 162-186 are repeated as described above. If, on the other hand, the byte count at decision step 186 exceeds zero, but the MPU-control byte from the first MPU 38 at decision step 188 indicates that it is not in the TIP state then the second MPU 40 posts an error at step 158 through RISR 96' and transitions back to the DONESTATE at step 116.

It should be appreciated that in FIG. 9, at decision step 177 and in FIG. 10 at decision step 188, the respective second and first MPUs 40 and 38 may be found to have transitioned out of the TIP state due to the provision of a CANCEL instruction by one of the service processors.

Thus, the control system 20 of the present invention advantageously permits the control of data transfers between at least two service processors without significantly burdening the operating system of any individual service processor. In the preferred embodiment of control system 20, the respective first and second service processors 22 and 24 use only six instructions to control such data transfers. The respective first and second MPUs 38 and 40 interact with each other, using MPU-control bytes, in order to control such transfers in response to the limited set of instructions provided by the service processors. The first and second ICTRs 30 and 32 control the actual bit-by-bit transfer of individual data bytes and MPU-control bytes in response to ICTR-control signals from the MPUs.

Furthermore, the novel control system 20 uses a full-duplex operating system to accomplish half-duplex data transfers. More specifically, the first and second ICTRs 30 and 32 operate in half-duplex. Whereas, the first and second MPUs 38 and 40 are implemented in full-duplex. Thus, less hardware is needed for the control system 20 to operate as if it was full duplex.

It will be understood that the above-described embodiment and method are merely illustrative of many possible specific embodiments and methods which can represent the principles of the invention. Numerous and varied other arrangements and methods can be readily devised in accordance with these principles without departing from the spirit and scope of the invention. Thus, the foregoing description is not intended to limit the invention which is defined by the appended claims in which:

What is claimed is:

1. In a multiprocessor system including a first service processor connect to a first memory and a second service processor connected to a second memory, a system for transferring data store in said first memory to said second memory in response to first transfer instructions issued by said first service processor and for transferring data stored in said second memory to said first memory in response to second transfer instructions issued by said second service processor, said system comprising:

first means connected to said first service processor and said first memory for receiving said first transfer instructions from said first service processor, for directly recovering and storing data to and from said first memory, for receiving the address in said first memory from said first storage processor for storing received data from said second memory, for generating first control signals in response to said first transfer instructions for recovering data from said first memory and for controlling the transfer of said data to said second memory and for generating second control signals for controlling the reception of data from said second memory;

second means connected to said second service processor and said second memory for receiving said second transfer instructions from said second service processor, for directly recovering and storing data to and from said second memory, for receiving the address in said second memory from said second service processor for storing receiving data from said first memory and for generating first control signals in response to said second transfer instructions for recovering data from said second memory and for controlling the transfer of said data to said first memory and for generating second control signals for controlling the reception of data from said first memory; and third means connected to said first and second means for transferring data from said first means to said second means in response to said first control signals generated by said first means and said second control signals generated by said second means, for transferring data from said second means to said first means in response to said first control signals generated by said second means and said second control signals generated by said first means and for continuously exchanging, between said first and second means, status and control information generated by said first means to said second means and status and control information generated by said second means to said first means whenever data is not being transferred between said first and second means.

2. The system of claim 1 wherein said third means comprises:

fourth means connected to said first means for receiving said first and second control signals generated by said first means and for receiving data to be transferred to said second memory, said fourth means having a first and second output and a first and second input;

fifth means connected to said second means for receiving said first and second control signals generated by said second means and for receiving data to be transferred to said first memory, said fifth means having a first and second output and a first and a second input; and sixth means for connecting said first output of said fourth means to the first input of said fifth means, said second output of said fourth means to said second input of said fifth means, said first output of said fifth means to said first input of said fourth means and said second output of said fifth means to said second input of said fourth means.

3. The system of claim 2 wherein both said fourth means further comprises:

a control register for receiving said first and second control signal generated by said first means;

a status register for maintaining the status of said first and fourth means;

an I/O register for storing data to be transferred between said first and second memories and for storing status and control information to be transferred between said first and said second means;

a control means connected to said sixth means, said control register, said status register and said I/O register for controlling the transfer of data and status and control information to and from said I/O register as a function of the contents of said control register; and said fifth means further comprises:

a control register for receiving said first and second control signal generated by said second means;

a status register for maintaining the status of said second and fifth means;

an I/O register for storing data to be transferred between said first and second memories and for storing status and control information to be transferred between said first and said second means;

a control means connected to said sixth means, said control register, said status register and said I/O register for controlling the transfer of data and status and control information to and from said I/O register as a function of the contents of said control register.

4. The system of claim 3 wherein:

said first means is connected to said status register in said fourth means and generates said first and second control signals and said status and control information as a function of the contents of said status register and said first transfer instructions; and said second means is connected to said status register in said fifth means and generates said first and second control signals and said status and control information as a function of the contents of said status register and said second transfer instructions.

5. In a multiprocessor system including a first service processor connect to a first memory a second service processor connected to a second memory, and a data transfer system for transferring data store in said first memory to said second memory in response to first transfer instructions issued by said first service processor and for transferring data stored in said second memory to said first memory in response to second transfer instructions issued by said second service process, said data transfer system having a first means connected to said first service processor, a second means connected to said second service processor and a third means connected to said first and second means, a method comprising three procedures for transferring data between said first and second memory, wherein said first procedure comprises the steps of:

receiving by said first means said first transfer instructions from said first service processor;

generating by said first means first control signals in response to said first transfer instructions for recovering data from said first memory and for controlling the transfer of said data to said second means;

generating by said second means second control signals for controlling the reception of data from said first means;

receiving by said second means from said second service processor the address in said second memory for storing received data from said first memory;

transferring data from said first means to said second means in response to said first control signals generated by said first means and said second control signals generated by said second means;

storing said data received by said second means from said first means directly from said second means into said second memory at said designated address in said second memory as specified by said second service processor;

wherein said second procedure comprises the steps of:

receiving by said second means said second transfer instructions from said second service processor;

generating by said second means first control signals in response to said second transfer instructions for recovering data from said second memory and for controlling the transfer of said data to said first means;

generating by said first means second control signals for controlling the reception of data from said second means;

receiving by said first means from said first service processor the address in said first memory for storing received data from said second memory;

transferring data from said second means to said first means in response to said first control signals generated by said second means and said second control signals generated by said first means;

storing said data received by said first means from said second means directly from said first means into said first memory at said designated address in said first memory as specified by said first service processor; and wherein said third process comprises the steps of:

generating first status and control information by said first means;

generating second status and control information by said second means;

continuously exchanging said first and second status and control information between said first and second means whenever neither said first or second process is being performed by said first, second and third means.

* * * * *

UNITED STATES PATENT AND TRADEMARK OFFICE
CERTIFICATE OF CORRECTION

PATENT NO. : 5,201,054
DATED : April 6, 1993
INVENTOR(S) : Narendra B. Dudhela

It is certified that error appears in the above-identified patent and that said Letters Patent is hereby corrected as shown below:

Column 13, Line 12, delete "service" and insert --storage--.

Column 13, Line 12, delete "receiving" and insert --received--.

Column 14, Line 40, delete "process" and insert --processor--.

Signed and Sealed this

Twenty-first Day of December, 1993

Attest:

BRUCE LEHMAN

Attesting Officer

Commissioner of Patents and Trademarks